(12) United States Patent
An et al.

(10) Patent No.: US 9,740,724 B2
(45) Date of Patent: Aug. 22, 2017

(54) DATA PARTITIONING FOR HIGH-EFFICIENCY DATA RETRIEVAL

(71) Applicant: International Business Machines Corporation, Armonk, NY (US)

(72) Inventors: Yongli An, Markham (CA); Mohammad Khatibi, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 14/264,621

(22) Filed: Apr. 29, 2014

(65) Prior Publication Data

US 2015/0310051 A1 Oct. 29, 2015

(51) Int. Cl.
*G06F 17/30* (2006.01)

(52) U.S. Cl.
CPC .. *G06F 17/30339* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 7,756,889 B2 | 7/2010 | Yu et al. | |
| 8,489,553 B2 | 7/2013 | Kulkarni et al. | |
| 9,471,657 B1* | 10/2016 | Xiao | G06F 17/30575 |
| 2010/0030800 A1 | 2/2010 | Brodfuehrer et al. | |
| 2010/0106934 A1 | 4/2010 | Calder et al. | |
| 2012/0203737 A1 | 8/2012 | Golos et al. | |
| 2012/0239612 A1* | 9/2012 | George | G06F 17/30563 707/602 |
| 2012/0303608 A1* | 11/2012 | Wu | G06F 17/30908 707/715 |
| 2013/0185337 A1* | 7/2013 | Lipcon | G06F 17/30138 707/813 |
| 2014/0101129 A1* | 4/2014 | Branish, II | G06F 17/30893 707/714 |

OTHER PUBLICATIONS

IBM, "Configuring pluggable keys", last updated: Nov. 2011, <http://pic.dhe.ibm.com/infocenter/mdm/v10r0m0/topic/com.ibm.mdmhs.dev.platform.doc/concepts/c_Configuring_Pluggable_Primary_Keys.html>.

IBM, "IBM InfoSphere Master Data Management V11 creates trusted views of your data assets to support operational and analytical initiatives", IBM United States Software Announcement 213-199, dated Jun. 4, 2013, pp. 1-70, Planned availability date electronic: Jun. 7, 2013, Grace Period Disclosure.

(Continued)

*Primary Examiner* — Syed Hasan

(74) *Attorney, Agent, or Firm* — David B. Woycechowsky

(57) ABSTRACT

Systematically enforcing generation of partition key values for records in a data management system such that for any given partitioned table, all records relating to a common business object share a common partitioning key. Partitioning and/or clustering of these records can then be done based on these specially generated partitioning key values, with entities dependent on the same first-class entity being placed in the same partition and/or cluster. This may provide considerable performance gains in at least some circumstances.

9 Claims, 4 Drawing Sheets

(56) References Cited

OTHER PUBLICATIONS

IBM, "Partitioning and Clustering Guide", IBM DB2 9.7 for Linux, UNIX, and Windows, © Copyright IBM Corp. 1993, 2009, SC27-2453-00, pp. i-454.

IBM, "Table partitioning and data organization schemes", DB2 Version 10.1 for Linux, UNIX, and Windows, as of Apr. 10, 2014, <http://pic.dhe.ibm.com/infocenter/db2luw/v10r1/topic/com.ibm.db2.luw.admin.dbobj.doc/doc/c0051501.html>.

IBM, "Partitioning and clustering", DB2 Version 10.1 for Linux, UNIX, and Windows, as of Apr. 10, 2014, <http://pic.dhe.ibm.com/infocenter/db2luw/v10r1/topic/com.ibm.db2.luw.admin.perf.doc/com.ibm.db2.luw.admin.perf.doc-gentopic9.html>.

IBM, "Partitioning key oriented partitioning sample", IBM InfoSphere Master Data Management, Version 10.1, Last updated: Sep. 12, 2012, <http://pic.dhe.ibm.com/infocenter/mdm/v10r1/topic/com.ibm.mdmhs.smpl.gd.doc/c_partitioning_key_sample.html>.

IBM, "Partitioning strategies for managing large databases", IBM InfoSphere Master Data Management, Version 10.1, Last updated: Sep. 12, 2012, <http://pic.dhe.ibm.com/infocenter/mdm/v10r1/topic/com.ibm.mdmhs.smpl.gd.doc/c_PartitioningStrategies.html>.

* cited by examiner

502 → | 504 →

| TABLE NAME | PRIMARY KEY VALUE |
|---|---|
| Org | 62403633713810071 3 |
| OrgName | 62133633713812731 4 |
| LocationGroup | 62253633713818352 7<br>62573633713822421 6 |
| AddressGroup | 62253633713818352 7 |
| Address | 62343633713816486 0 |
| ContactMethodGroup | 62573633713822421 6 |
| ContactMethod | 62413633713821328 1 |
| Identifier | 62203633713814601 2<br>62893633713816176 2 |
| ContEquiv | 62423633713824143 4<br>62883633713824456 8<br>62923633713824608 9 |

DATA PARTITIONING FOR HIGH-EFFICIENCY DATA RETRIEVAL

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) IBM, "IBM InfoSphere Master Data Management V11 creates trusted views of your data assets to support operational and analytical initiatives", IBM United States Software announcement 213-199, dated Jun. 4, 2013, pp. 1-70, planned availability date: Jun. 7, 2013.

BACKGROUND OF THE INVENTION

The present invention relates generally to the field of database systems, and more particularly to data partitioning for high-performance data retrieval.

Generally speaking, a database is an organized collection of entities and their relationships. An entity is a thing which can be uniquely identified and about which information can be collected. An entity is known as a first-class entity if it can exist in a system on its own and without dependence on the existence of any other first-class entity. For example, "person" and "physical address/location" might be first-class entities in given data model because both entities may be created and managed without any dependence on the existence of any other entity. In contrast, "driver's license" or "phone number" might be dependent entities because they must be associated with an existing person (or organization or device in the case of phone number) prior to their creation in the data model.

One common type of database is a relational database, where data is logically organized as a collection of tables of rows and columns. Each row, or record, in a table represents an ordered tuple of data, and each column represents an attribute of the tuple. Tables are commonly linked together in a structured fashion using one or more attributes of a row in one table as a key to access a related row of data in another table. A unique key, or candidate key, is a single column or set of columns in a database table whose values in any given row can be used to uniquely identify that row. Typically, a single unique key is selected to act as that table's primary key. Other rows in other tables (or even in the same table) can then use the values of this primary key as a reference, called a foreign key, to link back to the table and row where that primary key value is defined. Among the classes of linking relationships are one-to-one (for example, every department has only one manager, and vice versa), one-to-many (for example, a department has multiple employees, but each employee only works in a single department), and many-to-many (for example, many employees may work on a given project, and a given employee may work on multiple projects). A database management system (DBMS) may use clustering, via a clustering index, in an attempt to maintain the physical order of data on data pages in a storage object in the key order of the index when records are inserted and updated in a table.

A database may be partitioned into multiple instances, or nodes. These nodes may be logical nodes if they share the same physical hardware and/or operating system, or physical nodes if each resides on its own hardware and operating system. As defined by the database partitioning strategy, each node may have the same full set of tables, and/or only part of any given table may reside on each node. A partitioned database is common for business-intelligence-type workload and long-running analytical queries. Multiple database nodes can improve performance via parallelism, including process speed-ups for complicated queries.

A partitioned table in a database, on the other hand, is a table that has been broken into multiple partitions, or storage objects. All these partitions may reside in a single database node on the same storage system, or in multiple nodes across a partitioned database system. Known benefits of table partitioning include: (i) easy roll-in and roll-out of table data; (ii) higher table capacities; (iii) higher availability; (iv) easier administration; (v) flexible index placement; and/or (vi) higher performance/better query processing. One common type of table partitioning is range partitioning, wherein each row in a table is assigned a partition key value, and the range into which that value falls determines the partition for that row. Other types include list partitioning, hash partitioning, and composite partitioning.

Master data management (MDM) concerns itself with the management of master data. Master data is basic business data that is used across multiple systems, applications, and/or processes, and may, for example, include data about customers, products, employees, materials, suppliers, and vendors. Master data often includes slow-changing, non-transactional reference data, but is not necessarily limited to data of this type.

SUMMARY

According to three aspects of the present invention, there is a computer program product, system and/or method which performs the following actions (not necessarily in the following order and not necessarily in serial sequence): (i) receives a first plurality of records relating to a first business object, with the first plurality of records including all records in the data management system that relate to the first business object; (ii) for each record of the first plurality of records, generates a primary key value; (iii) for each record of the first plurality of records, determines a partitioning key value based on the primary key value for that record; and (iv) for each record of the first plurality of records to be stored in a partitioned table, stores the record in the partitioned table in volatile or non-volatile storage based on the partitioning key value of that record. The determination of partitioning key values of the first plurality of records is performed so that the partitioning key values result in all records of the first plurality of records to be stored in a partitioned table being stored in a first table partition of that partitioned table.

BRIEF DESCRIPTION OF THE DRAWINGS

FIG. 5 is a diagram showing the primary key values of table records in accordance with the present invention.

DETAILED DESCRIPTION

Figure 1:
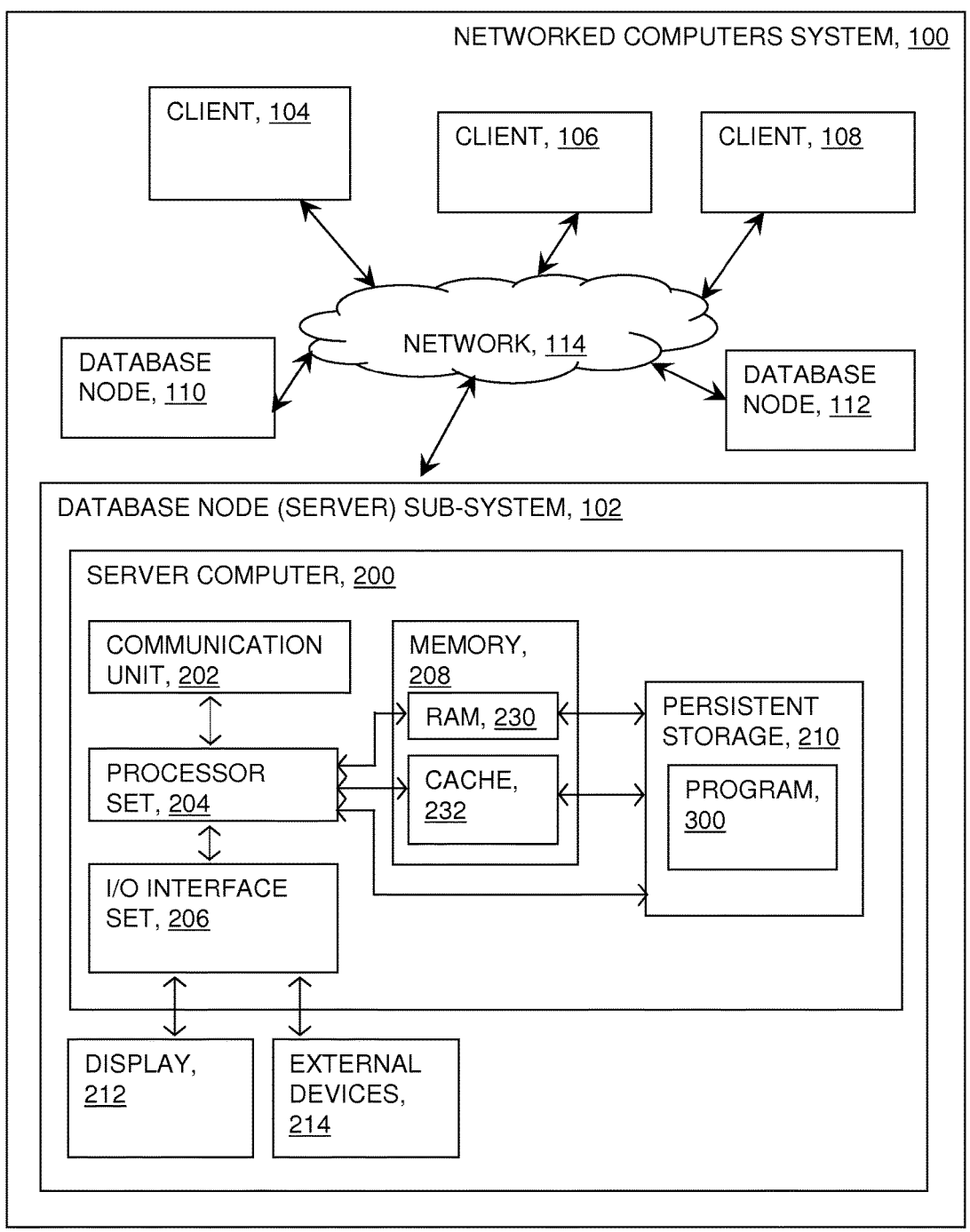
FIG. 1 is a schematic view of a first embodiment of a system according to the present invention.

Some embodiments of the present invention present a method for preparing records related through a shared first-class entity to be partitioned and/or clustered in a systematic way. In some embodiments of the present invention, the partitioning key value for each dependent entity is based on the partitioning key value of the first-class entity on which it depends. This characteristic of the partitioning key value can then be used to partition and/or cluster the records such that all records in a given table that are related to the same first-class entity are placed in the same table partition and/or cluster. This is done in a manner that is transparent to the user and can result in greater system efficiencies. In some embodiments of the present invention, the partitioning key is part of the primary key.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: database node (server) sub-system 102; client sub-systems 104, 106, 108; database nodes 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
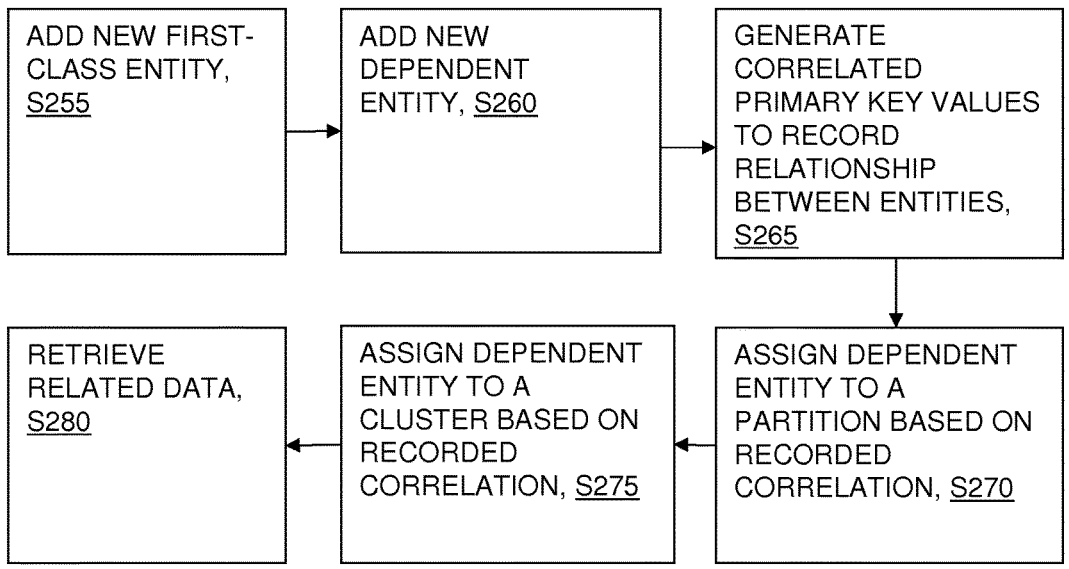
FIG. 2 is a flowchart showing a method performed, at least in part, by the first embodiment system.
Figure 3:
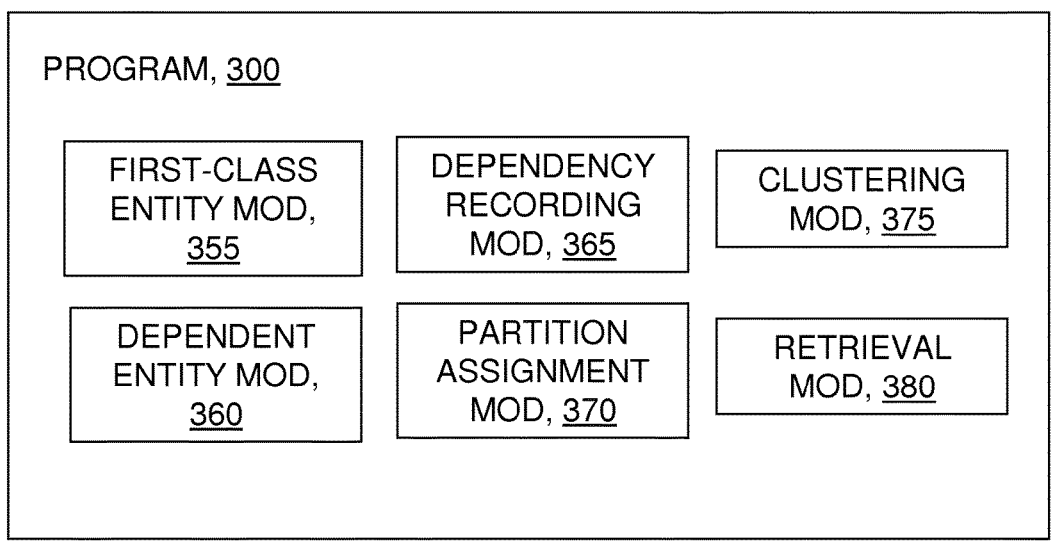
FIG. 3 is a schematic view of a machine logic (for example, software) portion of the first embodiment system.
Figure 4:
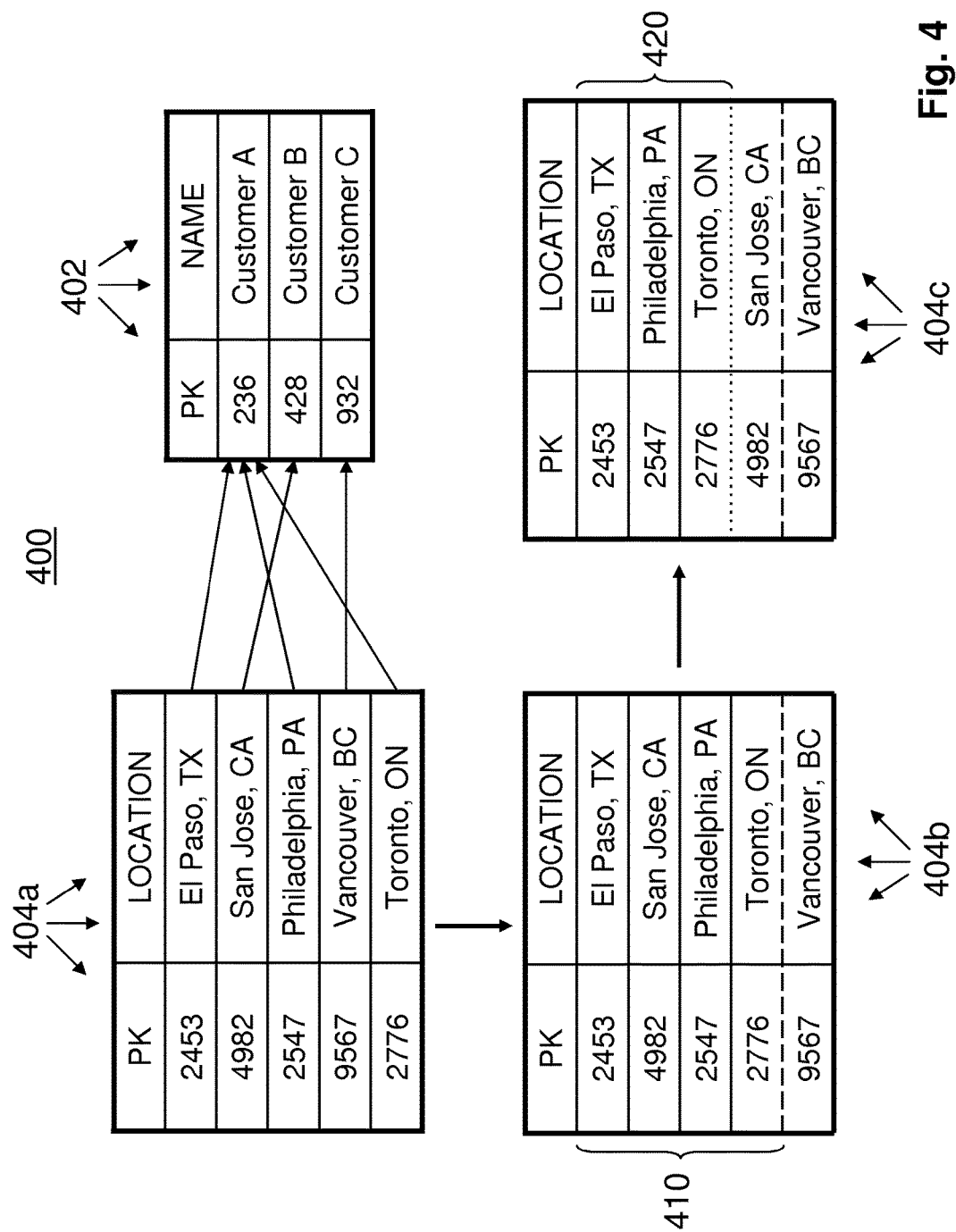
FIG. 4 is a diagram showing representations of data and relationships in the first embodiment system.

FIG. 2 shows flowchart 250 depicting a method according to the present invention. FIG. 3 shows program 300 for performing at least some of the method steps of flowchart 250. FIG. 4 shows diagram 400 depicting data and relationships resulting from application of this method to example data. This method and associated software will now be discussed, over the course of the following paragraphs, with extensive reference to FIG. 2 (for the method step blocks), FIG. 3 (for the software blocks), and FIG. 4 (for the resulting data and relationships). In this embodiment, a set of partitioned tables has been created prior to execution of the steps presented below. Alternatively, these tables and/or their partitions may be established as needed over the course of data processing.

Processing begins at step S255, where first-class entity module ("mod") 355 accepts information about a new first-class entity and adds it to the database. For example, first-class entity mod 355 receives the name of a new customer, "Customer C", and adds this information to customer names table 402. First-class entity mod 355 also generates a primary key for each customer name record it creates. Each primary key value uniquely identifies the record to which it pertains. The primary keys of the records in customer names table 402 are generated randomly in this embodiment, and the first digit of each primary key is used to assign each record in table 402 to a partition (not shown) of that table. Alternatively, the primary keys of table 402 are generated in some other fashion, and/or table 402 is not partitioned.

Processing proceeds to step S260, where dependent entity mod 360 receives new dependent entity information associated with a first-class entity. For example, dependent entity mod 355 receives new location information for Customer C, namely that Customer C has an office in Vancouver, BC. As another example, it receives augmented location information for Customer A, namely that Customer A has an office in Toronto, ON (in addition to the offices in El Paso, Tex. and Philadelphia, Pa. that had been previously recorded). It passes this information on to dependency recording mod 365 for dependency recording and entry of dependent entity information into the database, as described next.

Processing proceeds to step S265, where dependency recording mod 365 records a dependent entity's dependency by correlating the primary key of the dependent entity with the primary key of the first-class entity to which it pertains. Dependency mod does this by generating a primary key for each new entry in location table 404a such that the first digit of the new primary key matches the first digit of the primary key of the record from customer names table 402 with which the new location table entry is associated. For example, the primary key for the "Toronto, ON" entry in location table 404a is assigned a first digit of "2" because this entry is associated with Customer A, a first-class entity, whose entry in table 402 has a primary key that begins with "2". Alternatively, the dependency is recorded in a different way, such as by using the full primary key from customer names table 402 as part of the primary key for location table 404a, by using some other function of the primary key and/or other information from customer names table 402 to generate the primary key for location table 404a, or by ensuring that all primary keys in table 404a for entities dependent on the same first-class entity from table 402 share a particular characteristic, such as having the same parity (even/odd) as the primary key of the first-class entity, to name a few alternatives. Dependency recording mod 365 then records in the database all new information about the dependent entity.

By systematically generating primary keys for dependent entities in the fashion discussed above, dependent entities can be systematically partitioned in turn based on their relationship to a particular first-class entity as encoded in each dependent entity's respective primary key. Using such an approach for the generation of primary keys permits flexibility as to when to partition a table—the decision about whether to partition can be deferred without hassle, because the desired partition criterion (namely, dependency on a first-class entity) is already adequately encoded in each dependent entity's primary key.

To elaborate, an implementation using this approach can start with a database not using table partitioning but can relatively easily be converted to one using table partitioning and having all the benefits of table partitioning as if partitioning had been used from the start. That is, without this step, if a user initially forgot to use partitioning, or decided to not use it (perhaps initially deeming it unnecessary due to having a relatively small volume of data), an entire database of 100+ millions of existing records might be loaded without any table partitioning logic (that is, without the primary key generation logic for partitioning discussed above). Once done, there would be almost no way for the user to reload the whole database to get the records to a desired table partitioning state with the same performance benefit as if this step had been employed. This is because the primary key values or values of any column chosen as the partitioning key would not have been generated in such a way as to systematically allow table partitioning based on entity relationships. Regenerating the keys before a reload or during a reload is almost impossible, because at that point, the business logic and relationship is no longer available). Yet with the approach discussed here, users can reload freely by just defining the table partitioning at the database layer, because the keys are already perfectly generated to capture the desired business relationships/dependencies to arbitrary depth. This allows users to get to the same state—at any time—as where they would have been had they done the partitioning from the very beginning.

Processing proceeds to step S270, where partition assignment mod 370 uses the dependency information to assign each new dependent entity to a partition. For example, because dependency data in table 404a is based on the first digit of that table's primary key, partition assignment mod 370 uses the primary key column of table 404a as a range partitioning key to partition new entries in table 404a into one of two ranges: entries with primary key values from 0 to 4999 and entries with primary key values from 5000 to 9999.

As shown in table 404b, the entry for "Toronto, ON" has primary key value "2776", and so has been assigned to partition 410, the table partition for entries with primary key values ranging from 0 to 4999. Because partition assignments are coordinated with the dependency recording mechanism, partition 410 is also the partition to which the other entities in table 404a have been assigned that are dependent on the same parent entity from table 402 as the "Toronto, ON" entry—namely, the "Customer A" entry from table 402. Alternatively, another type of partitioning may be used, such as hash partitioning. As long as the method of partitioning is coordinated with the dependency recording mechanism, dependent entities related to the same parent will be assigned to the same partition (or subset of partitions). In some embodiments, first-class entities and their dependent entities will always be assigned to the same range partition of their respective tables, for example because these entities share the same first digit(s) of a fixed-digit primary key and the range partitions are the same for each table. This approach may make the system easier to understand and manage.

Processing proceeds to step S275, where clustering mod 375 clusters the entries in partition 410 based on the recorded dependency information. This clustering results in related entries being stored on the same or adjacent storage pages. For example, as shown in table 404c, the entry for "Toronto, ON" has been clustered together with its siblings (that is, entries having the same parent entity from table 402) such that all of these entries are found on page 420 of storage, where the clustering was based on dependency information as recorded in the primary keys of entries in this table. Alternatively, clustering is done based, at least in part, on dependency information recorded in some other fashion.

Processing proceeds to step S280, where retrieval mod 380 responds to a user request for information by retrieving that information and presenting it to the user. Because partition assignment mod 370 and clustering mod 375 position table entries based on their parentage, retrieving information related in this fashion is more efficient than it would otherwise be. For example, if a user requests all information about Customer A, the location information from table 404c will be accessed from a single partition (partition 410) and a single storage page (page 420), resulting in more efficient query processing.

In this embodiment, the primary key field of table 404c is a multipurpose field that is used: (i) as a primary key, to uniquely identify the row of data with which it is associated; (ii) as a repository of entity dependency information; (iii) as a range-partitioning key for storage organization; and (iv) as a clustering key for storage organization. Reducing the number of keys and fields reduces confusion and makes the system easier to use. Moreover, all else being equal, using the same, automatically generated key for each purpose ensures that related records are organized to be logically and physically close to each other, resulting in more efficient retrieval of information related through a shared first-class entity.

Data clustering and table partitioning are independent concepts, and some embodiments may use one, the other, or both. Alternatively or in addition, some embodiments may make use of database partitioning as well. Relationships may in general extend to any depth, with dependent entities below the first level being indirectly dependent on a first-class entity through a dependent intermediary. Furthermore, if the same table partitioning scheme is used for multiple tables (say, range partitioning on primary key values, where the same ranges are used) and the same indicator is used for related entities in multiple tables (for example, the first digit of a primary key that is of the same fixed-length format for all entities that are related across all tables), then all related entities will end up in the same table partition (though of their respective tables), which may make the database easier to use and/or manage.

In general, at least for the purposes of table partitioning, a function used for recording dependency information may not necessarily provide a unique mapping between parents and children. There are two reasons for this. First, the function may not have a mathematical inverse. For example, first-class entity X and first-class entity Y may have primary keys beginning with "2" and "4", respectively, while correlation information in the primary keys of their children may be recorded via values that begin with "0" if the parent entity primary key begins with an even number or "1" if the parent entity primary key begins with an odd number. All children of first-class entity X will therefore end up in the same partition, but the correlation information recorded in this manner is not granular enough to determine, from this information alone, whether these records are children of X or children of Y. Second, the function may not have a functional inverse. That is, multiple first-class entities may share the same correlation values. For example, first-class entities X and Y may have primary keys that both begin with "1". If the primary keys of their children are generated so that they begin with these same primary key values for partitioning purposes, then children of X will end up in the same partition based on this recorded dependency information, but the information is again not granular enough to determine, from this information alone, whether such records are children of X or children of Y. Therefore, dependency information recorded via a mathematically or functionally non-invertible function will not necessarily uniquely map between a dependent entity and its parent entity, but can nevertheless still be used effectively for grouping related entities into the same table partition.

III. Further Comments and/or Embodiments

Some embodiments of the present invention recognize the following facts, potential problems and/or potential areas for improvement with respect to the current state of the art: (i) there are several groups of tables in an MDM data model, and within each group, the tables are related to one another; (ii) there is some flexibility in the data model such that a customer/user can make such tables related; (iii) in a typical master data management (MDM) solution, many database records within multiple database tables may be retrieved within a single inquiry service, as all such records are related and cumulatively represent the full information of a first-class entity such as a person, an organization, or a contract; (iv) these database records and/or their associated metadata may have been saved in different physical objects and locations (for example, in different database tables, table partitions, and associated indices) within the database system(s); and/or (v) without an appropriate mechanism to group and partition all these related data so that certain database functionality such as table partitioning can be leveraged for optimal performance, any data retrieval of such disparate records would unnecessarily strain the database system by imposing multiple input/output (I/O) operations on different parts of the database, causing unnecessary delay in service and poor performance. For example, a query against a single retail organization with 100 retail locations and 200 retail phone numbers could result in a single inquiry service retrieving a total of 1+100+200=301 records. If such records are physically disparate and scattered across database objects (table partitions and index partitions, for example) this would not be efficient and would not be good for performance.

Further, some embodiments of the present invention recognize that in the MDM data model, some tables are related to each other via a foreign key, while other tables are related to each other, but not via a foreign key relationship. When tables are related via a foreign key, the foreign key can be used as the table partitioning key as well, but for the tables not related via a foreign key, another approach is necessary. Such an approach could include using the primary key (which would not necessarily have the same partitioning digits for all related entities) or adding another column as a foreign key just for the purpose of table partitioning and/or clustering. However, such approaches are not good enough and are limited and cumbersome. For example, partitioned tables do not all necessarily share the same primary key structure, parent entities do not necessarily share the same primary key structure as that of their children, and the primary key is not necessarily used to partition the tables of both parents and children even if both parent and child tables are partitioned. On the other hand, a system that always uses the primary key for table partitioning and makes sure all primary key values have the same partitioning digit(s) would make things simpler and would result in fewer indexes/columns/keys to worry about.

Some embodiments of the present invention may include one, or more, of the following features, characteristics and/or advantages: (i) use a primary key as the range partitioning key for a table; (ii) enforce generation in a particular format of the primary key for each correlated record in multiple database tables; (iii) enforce generation of the primary key of each correlated record in multiple database tables such that these keys share certain digits or bits; and/or (iv) enforce the same primary key generation regardless of whether the first-class entity is being added for the first time or is being augmented through the addition of correlated records.

For instance, some embodiments may have a default configuration that ensures: (i) that all primary keys of relevant records are 18 digits in length; and (ii) that the two most-significant digits of the primary key stay the same for all records of a given instance of a first-class entity (the first-class entity being, for example, a certain organization, person, or contract). Along with applying appropriate table range partitioning for the tables involved by using the primary keys as the partitioning keys at the database level, such an approach ensures all needed data for a given entity will be available within the same table partition, eliminating any extra I/O that would be required if these data are in different partition ranges. Further, with proper data clustering, the number of I/O requests within the same partitioning range may also be significantly reduced. Some embodiments of the present invention recognize that inclusion of the partition key in the primary key makes the product easier to use because: (i) there will be one less index to maintain; (ii) there is no need to define a separate key for partitioning; and/or (iii) one cannot miss a primary key definition.

Some embodiments of the present invention may include one, or more, of the following features, characteristics and/or advantages: (i) a primary key generation formula for generating primary keys with a configurable format; (ii) a mechanism to assign primary keys to all augmentations of a first-class entity, so all the augmented records stay in the same partition as the associated initial record(s); (iii) a default range partitioning on the primary keys; (iv) no added performance cost when adding new records to the database; and/or (v) performance gains when retrieving correlated records in a database, as these records are all grouped together in their respective table partition.

Some embodiments of the present invention include a primary key generator component that accepts a format parameter, permitting primary keys to be generated in a flexible format of the user's choice. The format may be a string text that is comprised of certain identifiers along with the desired length for each identifier. For example, these identifiers may include: (i) S: "Service-Level Entity Context" identifier; (ii) R: "Random Number" identifier; (iii) T: "Timestamp" identifier; (iv) I: "Instance" identifier (a unique number for each system node in a clustered environment). The format may also contain one or more prefixes, such as: (i) V: specifies if the keys are generated with variable length (where the default is fixed length); and/or (ii) B: specifies whether or not the specified length represents the number of bits (where by default it specifies the number of decimal digits).

For example, specifying the format "BV/S8T40R9I6" would instruct the system to generate 63-bit (maximum) variable-length primary keys, each with an 8-bit (max) random number per service call (S), a 40-bit timestamp (T), a 9-bit random number (R), and a 6-bit instance number (I). Specifying "B/S8T40R9I6" would result in generation of 63-bit fixed-length primary keys, each having an 8-bit random number per service call, a 40-bit timestamp, a 9-bit random number, and a 6-bit instance number. "V/R4T12I2" would result in 18-digit (maximum) variable-length primary keys, each formatted as a 4-digit (max) random number followed by a 12-digit timestamp followed by a 2-digit instance number. Likewise, "R4T12I2" would produce 18-digit fixed-length primary keys, each composed of a 4-digit random number preceding a 12-digit timestamp preceding a 2-digit instance number.

In some embodiments of the present invention, the default key generation format is chosen to be "S2R2T1212". Because of the "S2" in the format, all the correlated primary keys for each instance of a first-class entity (such as Person, Organization or Contract) are generated with the same two most-significant digits. For example, all primary keys of the correlated records for a certain organization may be generated randomly (but with the same two most-significant digits) when the organization's data is added to the system; its future data augmentations will also be added with primary keys in the same range (again because they will share the same two-most significant digits).

In some embodiments of the present invention, the default key generation format is chosen to be "I2S2R2T12". Because of the "I2S2" in the format, all the primary keys for records associated with the same first-class entity and created at the same system node in a clustered environment are generated with the same four most-significant digits. Including system node information (instance ID) in the portion of the primary key used as a partitioning and/or clustering key may result in additional storage and/or operational efficiencies as compared to using service-level entity context information alone for this purpose.

In some embodiments of the present invention, when the system needs to generate a primary key for a first-class entity the first time, it generates a random number of the specified length (not already in use as a primary key value in that table). This ensures the first-class entity is randomly distributed among the supported partitions. Then for subsequent augmentations (when new correlated records are being added), it: (i) determines the primary key of the owner (that is, the first-class entity); (ii) retrieves the value of the "Service-Level Entity Context" digits from that primary key; and (iii) ensures all other new primary keys are generated with the same two most-significant digits. Furthermore, all tables are created with range partitioning on the primary keys whose values are generated in this fashion. Together, this results in all correlated records being saved in the same database partition and ensures the minimal number of I/O requests in the database system.

Shown in FIG. 5 is table 500. Table 500 shows a list of all the primary keys that have been generated with respect to a certain Organization entity in a particular instance of an embodiment of the present invention. Table name column 502 shows the names of the tables in the database system containing records for the given Organization, while primary key value column 504 gives the primary keys for each of those records. For example, record 510 is in table "LocationGroup" and has primary key value "625736337138224216". As can be seen, some of the database tables contain multiple records associated with the Organization entity, while others contain only one. All the primary keys for this Organization were generated with the same leading digits—"62". Because of this, range partitioning based on (the leading digits of) the primary keys results in all of the related records in any given table being stored in the same table partition, and as a consequence, all database I/O for these records occurs on a single partition. This may provide a considerable performance gain in at least some circumstances.

In some embodiments of the present invention, the primary key is used as the table range partitioning key, and characteristics of the primary key values are shared among related entities such that they use the same partitioning key value, ensuring related entities are placed into the same partition. This is desired and important for sibling entities in the same table, as well as for related entities in different tables, because this reduces data thrashing between multiple database members (that is, database subsystems from the same data sharing group) in a data-sharing environment (data sharing enables applications that run on more than one database subsystem to read from and write to the same set of data concurrently).

Some embodiments of the present invention may include one, or more, of the following features, characteristics and/or advantages: (i) are based on a single primary key column filled with generated values in configurable digit/bit format; (ii) use the primary key column for range partitioning; (iii) ensure hierarchically related entities use the same partition key value as their owner/parent/first-class entity; (iv) assign partition keys independently of the session and when the owner/parent/first-class entity was initially created; (v) ensure all hierarchically related entities are always in the same partition range as their owner/parent/first-class entity; (vi) ensure high data-access efficiency when retrieving related entities; (vii) generate partitioning key values in a well-defined form; (viii) generate partition key values automatically and/or systematically; (ix) use the same generated partitioning key values (or bits) for the primary key (or part of the primary key) of all the related tables, including parent and related children entities (possibly N levels deep as a family tree); (x) define the primary key column (or part thereof) as the partitioning key to ensure the related children entities (table records) physically reside in the same partition of the table; (xi) implicitly use this same primary key index as a cluster index for a given table, which will cluster the related entities (for example, those belonging to the same parent) of the table next to each other on the same data page and/or on neighboring data pages; (xii) achieve high I/O efficiency and/or ensure good data retrieval performance from a populated MDM database model; (xiii) build MDM business logic into the keys when using such basic database features as partitioning; (xiv) use range-partitioned tables; (xv) form the keys for related MDM objects such that they are in the same range of a table so that the retrieval of such related objects as required by MDM business is more efficient, with much more minimized I/O; (xvi) cluster related data together physically with the help of a clustered index using the same table partitioning key, which further reduces the required I/O and lessens demand for buffer pool memory; and/or (xvii) build key generation with MDM server data model knowledge in it.

Some embodiments of the present invention may include one, or more, of the following features, characteristics and/or advantages: (i) require a predefined static list of partitions in a database; (ii) leverage the table partitioning feature in a database; (iii) enable MDM applications to work with database partitions and allow all related records for a given entity (such as person or organization) to be stored in only a single partition based on certain MDM logic (defined as a relationship in MDM); (iv) achieve faster retrievals of the parent entity and its related children entities in an MDM system; (v) are significant to MDM data models and/or workloads; (vi) group related business objects into the same partition; (vii) generate "partitioning key values" (on the application side) by defining the right partitioning key columns (on the database table side), where these partitioning key values are shared among related objects (parents/children) so that those objects are stored in the same partition; (viii) ensure all hierarchically related entities end up in the same partition (in an MDM context, hierarchical relationships are defined by the MDM data model, which reflects business requirements from real life); (ix) result in optimal data partitioning; (x) provide high-efficiency retrieval of master data; (xi) implement a method and design of data partitioning that allows an MDM system to achieve high performance and scalability with low cost and contention; (xii) automatically allocate related records among different pre-partitioned/pre-clustered database tables into a single partition/cluster through a shared first-class entity in a systematic way; (xiii) generate primary keys such a way that they can be used for partitioning; (xiv) permit the actual scripts to perform partitioning/clustering of the database tables to be prepared or changed later by the users; (xv) do not require a specific partitioning script; (xvi) do not automatically generate partitioning scripts; and/or (xvii) supply a default pre-written partitioning script.

In addition, some embodiments of the present invention may also include one, or more, of the following features, characteristics and/or advantages: (i) keep newly inserted data organized in key sequence; (ii) continuously spread new data uniformly across partitions; (iii) maximize the isolation of inserts from concurrent threads into different partitions; (iv) statistically balance the distribution of data across all the table partitions; and/or (v) use a key generation procedure which achieves one or more of these goals to help maximize the performance benefit of database partitioning.

With respect to performance in master data management systems, the benefits from applying the teachings described herein can range from minimal to very significant—up to multiple times better—as compared to system performance when not using these techniques. The benefits of implementing partitioning keys as described herein may be dependent on a number of factors, including: (i) data characteristics of a specific MDM implementation; (ii) workload characteristics of a specific MDM implementation, and/or (iii) how much the system is I/O constrained in an MDM database environment. A system that is heavily I/O constrained and RAM constrained (for example, where there is not enough memory to have large buffer pools for the database), the performance impact of a well-designed key arrangement facilitating MDM data storage with awareness of the relationship among MDM objects can be very significant, because if the objects not arranged with respect to their relationships, the excessive sync I/Os significantly reduce the performance of impacted transactions. Theoretically, the performance could be N times worse as compared to performance when applying the techniques as described. On the other hand, in some cases where the above constraints are not so obvious due to small size or light workload, the benefits may be minimal. In general, those with large databases, complicated workloads and/or relationships among the data, and/or high system loads are likely to see the greatest benefits from applying these techniques to achieve good performance and maintain good performance as their system and/or system usage grows.

The techniques presented herein may be used by MDM systems as well as in any other type of workload, application, data model, and/or context which could benefit from organizing related data in the manner described in this Detailed Description.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Business object: a representation of a business entity, such as a person, organization, contract, invoice, or transaction.

What is claimed is:

1. A method for use with a database including a table including a set of supported partitions, the method comprising:

creating a primary key definition having a predefined format for use as a range partitioning key for a table, with the predefined format including the following identifier fields: service-level entity context, random number, timestamp and instance, with instance being a unique number for each node in a clustered environment;

assigning a default key generation format for the primary key definition, such that the default key generation format causes: (i) all primary keys for each instance of a first class entity to be generated with a common code, (ii) all primary keys of a set of correlated records for a particular organization to be generated randomly at the time they are initially stored in a first range of the table, and (iii) future data augmentations to the set of correlated records for the particular organization to be stored in the first range, thereby ensuring the first class entity is randomly distributed among the set of supported partitions of the table;

generating a primary key for the first class entity for a first time, by generating a random number with a defined length, so that records relating to the first class entity will be randomly distributed among the set of supported partitions;

generating subsequent augmentations when new correlated records are added, using the primary key of the first class entity to retrieve a value of service-level entity context field from the first class entity, thereby ensuring all other new primary keys are generated with the common code;

creating a set of database tables with range partitioning on the primary keys generated; and saving all correlated records in a common database partition.

2. The method of claim 1 wherein the common code is located at the two most significant digits of the primary keys for each instance of the first class entity.

3. The method of claim 1 where the first class entities include at least the following types of first class entities: people, organizations and contracts.

4. A computer program product (CPP) for use with a database including a table including a set of supported partitions, the method comprising:

a machine readable storage device; and computer code stored on the machine readable storage device, with the computer code including instructions for causing a processor(s) set to perform operations including the following:

creating a primary key definition having a predefined format for use as a range partitioning key for a table, with the predefined format including the following identifier fields: service-level entity context, random number, timestamp and instance which is a unique number for each node in a clustered environment, assigning a default key generation format for the primary key definition, such that the default key generation format causes: (i) all primary keys for each instance of a first class entity to be generated with a common code, (ii) all primary keys of a set of correlated records for a particular organization are generated randomly at the time they are initially stored in a first range of the table, and (iii) future data augmentations to the set of correlated records for the particular organization are stored in the first range, thereby ensuring the first class entity is randomly distributed among the set of supported partitions of the table, generating a primary key for the first class entity for a first time, by generating a random number with a defined length, so that records relating to the first class entity will randomly distributed among the set of supported partitions, generating subsequent augmentations when new correlated records are added, using the primary key of the first class entity to retrieve a value of service-level entity context field from the first class entity, thereby ensuring all other new primary keys are generated with the common code, creating a set of database tables with range partitioning on the primary keys generated, and saving all correlated records in a common database partition.

5. The CPP of claim 4 wherein the common code is located at the two most significant digits of the primary keys for each instance of the first class entity.

6. The CPP of claim 4 where the first class entities include at least the following types of first class entities: people, organizations and contracts.

7. A computer system comprising:

a processor(s) set;

a machine readable storage device; and computer code stored on the machine readable storage device, with the computer code including instructions for causing the processor(s) set to perform operations including the following:

creating a primary key definition having a predefined format for use as a range partitioning key for a table, with the predefined format including the following identifier fields: service-level entity context, random number, timestamp and instance which is a unique number for each node in a clustered environment, assigning a default key generation format for the primary key definition, such that the default key generation format causes: (i) all primary keys for each instance of a first class entity to be generated with a common code, (ii) all primary keys of a set of correlated records for a particular organization are generated randomly at the time they are initially stored in a first range of the table, and (iii) future data augmentations to the set of correlated records for the particular organization are stored in the first range, thereby ensuring the first class entity is randomly distributed among the set of supported partitions of the table, generating a primary key for the first class entity for a first time, by generating a random number with a defined length, so that records relating to the first class entity will randomly distributed among the set of supported partitions, generating subsequent augmentations when new correlated records are added, using the primary key of the first class entity to retrieve a value of service-level entity context field from the first class entity, thereby ensuring all other new primary keys are generated with the common code, creating a set of database tables with range partitioning on the primary keys generated, and saving all correlated records in a common database partition.

8. The computer system of claim 7 wherein the common code is located at the two most significant digits of the primary keys for each instance of the first class entity.

9. The computer system of claim 7 where the first class entities include at least the following types of first class entities: people, organizations and contracts.

* * * * *